Nov. 6, 1962
R. B. JOHNSON
3,062,924
FILM TRANSPORT SYSTEM FOR SOUND RECORDING
AND REPRODUCING DEVICES
Filed Nov. 2, 1959
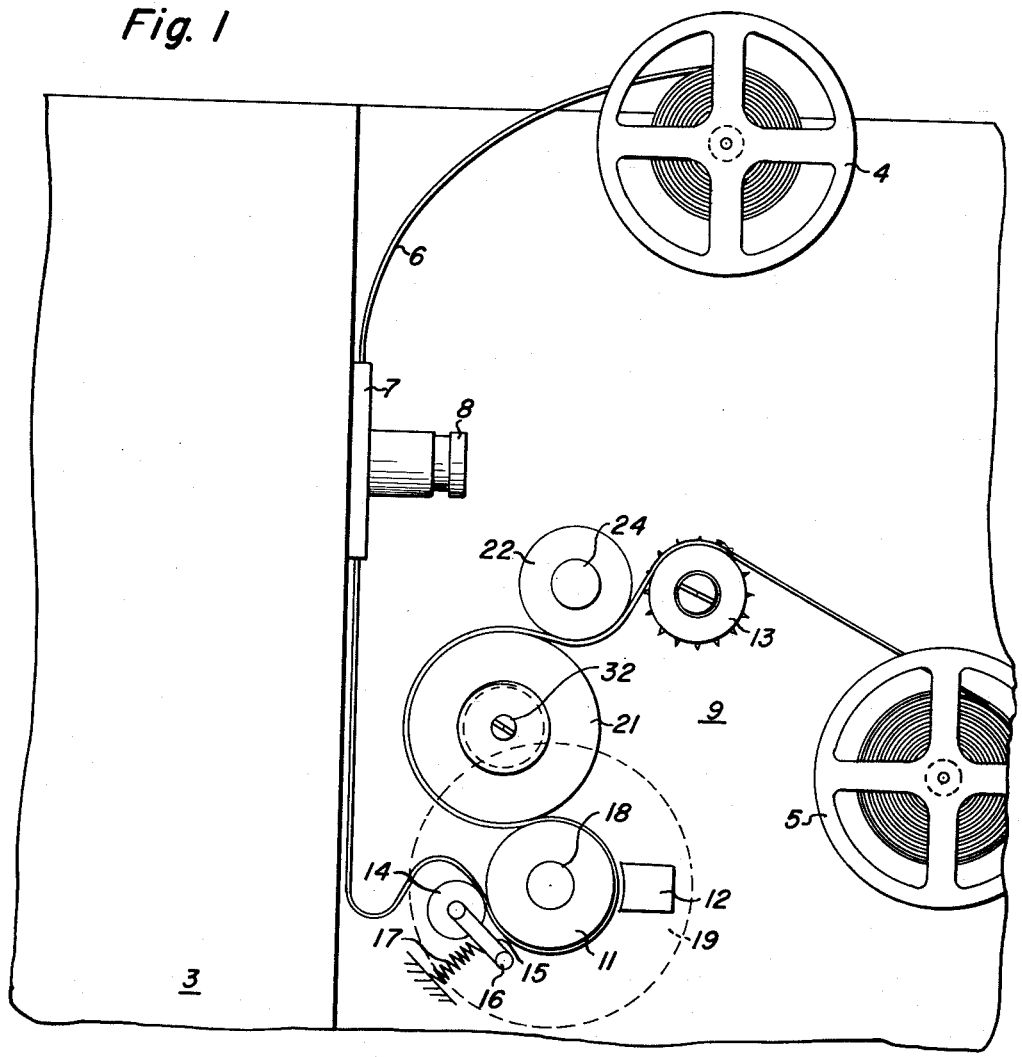
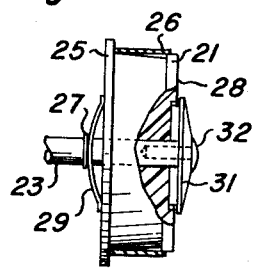
ROBERT B. JOHNSON
INVENTOR.
BY R. Frank Smith
Steve W. Grenbow
ATTORNEYS

United States Patent Office 3,062,924
Patented Nov. 6, 1962

3,062,924
**FILM TRANSPORT SYSTEM FOR SOUND RECORD-
ING AND REPRODUCING DEVICES**
Robert B. Johnson, Rochester, N.Y., assignor to Eastman
Kodak Company, Rochester, N.Y., a corporation of
New Jersey
Filed Nov. 2, 1959, Ser. No. 850,209
8 Claims. (Cl. 179—100.3)

This invention relates generally to film transport systems, and more specifically to an improved film transport system for a sound recording and reproducing mechanism such as a moving picture sound projector and the like.

In the past, two systems have primarily been used for recording sound on film and for reproducing the sound therefrom. One of these systems utilizes an optical sound track on the film and in recording the sound thereon, a beam of light varying in intensity with soundwaves to be recorded is impressed upon the optical sound track. In the sound reproduction, a beam of light of constant intensity is projected through the sound track portion with the mergent light beam modulated by the sound track for an impression upon a light-sensitive device. In the remaining system, a magnetic sound track is utilized consisting of a strip or layer of pulverized magnetizable material deposited or coated upon the film. In this system, the varying sound currents supplied by the recording device causes the successive areas of the magnetic track to be subjected to varying degrees of magnetization along the length of the track. In the sound reproduction, the variable magnetic areas will be converted back to the corresponding sound currents for reproduction by a loudspeaker or other reproducing device. In both of these systems of recording sound on film and reproducing the sound therefrom, it is extremely important that the film be transported uniformly and at a constant speed past the optical or magnetic recording and reproducing mechanism, and that the sound track portion of the film be maintained in a constant position with respect to whichever mechanism is used. In the film transport systems used in the past, although most of them achieved the objective of transporting the film through the recording and reproducing mechanism with the sound track in register therewith, most of them were objectionable in that they introduced undesired frequencies which modulate the reproduced sound on the sound track. The undesired frequencies are normally referred to in this art as "flutter" and "wow." A "flutter" is normally referred to as a periodic motion anomaly in the direction of film travel with a frequency of 10 cycles per second or above, and the "wow" refers to a periodic anomaly in the direction of film travel with a frequency below 10 cycles per second. A large portion of the "flutter" is produced by the engagement of the sprocket teeth with the perforations in the film and by the irregularities in the driving gear train. "Flutter" also results from the film characteristics itself, namely its longitudinal and transverse compliance characteristics. The transverse compliance of the film along with the moment of inertia of the flywheel will cause the flywheel to oscillate at a natural frequency determined by the values of compliance and moment of inertia. The longitudinal compliance is uniformly distributed from the sound drum to the drive sprocket, and coupled with the moment of inertia of the flywheel also tends to sustain an oscillation. The "wow" on the other hand is primarily produced by gross irregularities in the sprocket drive system, the sound drum and shaft, and improper articulation of the pressure roller. As a practical matter, the gross irregularities in the sprocket drive system and sound drum and shaft may be kept to a low level.

The primary object of the present invention is to provide an improved film transport system for a sound recording and reproducing mechanism that will greatly attenuate the "flutter" and partially attenuate the "wow" that is developed by the system.

Another object of this invention is to provide an improved film transport system for a sound recording and reproducing mechanism in which the "flutter" resulting from the starting transient is very rapidly dampened.

Still another object of the invention is the provision of an improved sound recording and reproducing mechanism that is extremely stable in operation, completely damping out any introduced oscillations in the system within a very short time interval.

Another important object of this invention is to provide an improved sound recording and reproducing mechanism in which the passage of normal splices through the mechanism does not produce any perceptible "wow."

An additional object of the invention is the provision of an improved sound recording and reproducing mechanism in which the oscillation of the film over the sprocket is eliminated.

A still further object of this invention is to provide an improved sound recording and reproducing mechanism having a fixed film path that provides easy threading.

Another object of the invention is the provision of an improved sound recording and reproducing mechanism that is of simple design and construction, thoroughly reliable and efficient in operation, and economical to manufacture.

Still another object of the invention is to provide an improved sound recording and reproducing mechanism in which the film advance sprocket constantly functions as a drive sprocket without the necessity for carefully controlling the bearing clearances in order to provide sufficient film drag to assure such operation.

Objects and advantages other than those set forth above will be apparent from the following description when read in connection with the accompanying drawing, in which:

FIG. 1 is a fragmentary side elevation view showing a preferred embodiment of a moving picture projector in which the recording and reproducing mechanism of this invention is embodied, and FIG. 2 is a side elevation view of one of the support rollers of FIG. 1 with a portion thereof broken away and sectioned.

As shown in the drawings, a portion of the moving picture projector is disclosed comprising a casing 3 having film supply and take-up spools, 4, 5 respectively, the latter being driven of course, by means not shown. A reciprocating claw mechanism of any known type, not shown, is provided for intermittently moving a film 6 through a film gate 7 for projection through a lens 8. A film transport system shown generally at 9 is provided for guiding and directing film 6 from film gate 7 past a sound scanning station including a sound drum 11 and a recording and reproducing head 12 of any known type, shown diagrammatically in FIG. 1, to a drive sprocket 13 which is adapted to pull film 6 through the film transport system 9.

The film transport system 9 comprises a pressure roller 14 carried by an arm 15 pivoted at 16 and urged by a spring 17 into engagement with the periphery of sound drum 11. The pressure roller 14 is of the usual type normally constructed of some suitable metal and has a peripheral groove, not shown, in register with the picture bearing portion of film 6 to prevent any damage thereto. The sound drum 11 is secured to a shaft 18 which is rotatably mounted in a bearing, not shown, carried by casing 3. The shaft 18 is in alignment with a shaft, not shown, upon which a flywheel 19, shown dotted, of known type is mounted. A friction clutch of any known type in the art, not shown, couples the shafts together, and allows sound drum 11 which is driven by the friction of film 6 which is wrapped around approximately three-fourths of the periphery of sound drum 11, to slip relative to flywheel 19 when the projector is initially turned on to advance film 6 therethrough. Interposed between sound drum 11 and drive sprocket 13 are two closely spaced support rollers 21, 22 rotatably mounted on spindles 23, 24 respectively fixedly secured to casing 3. Since the distance between rollers 21, 22 is substantially equal to the thickness of film 6, film 6 is supported at all times by one or the other of the rollers 21 and 22 as it passes from one roller to the other. Roller 21 is similarly spaced with respect to drum 11 so that the film is supported at all times by roller 21 or drum 11 as it passes from the drum to the roller. The relationship is such that at one point between drum 11 and roller 21 and at one point between rollers 21, 22 film 6 is tangent to both supporting members. The roller 21, as best seen in FIG. 2, has a side flange 25 for guiding one edge of film 6, and an undercut portion 26 to prevent marring the film emulsion. The spindle 23 has a washer and a spring disc 29 is interposed between washer 27 and the face of side flange 25. Another washer 31 bears against the opposite face 28 of roller 21, and a screw 32 passing through washer 31 is threaded into the end of spindle 23 for adjustably positioning roller 21 axially along spindle 23 for adjusting the braking force supplied by spring 29 to roller 21. The braking force applied to support roller 21 subjects film 6 between sound drum 11 and sprocket 13 to a tensile force in opposition to the tensile force applied to film 6 for winding film 6 on take-up spool 5, thereby tending to keep film 6 taut and minimizing the tendency of film 6 to oscillate, particularly the unsupported portion or reach of film 6 between roller 22 and sprocket 13. Although the braking force is shown applied only to roller 21, it may also be applied to roller 22 by similar structure, or only to roller 22. Since rollers 21, 22 and sound drum 11 are closely spaced as indicated, film 6 is completely supported from drum 11 to sprocket 13 except for a small portion thereof between roller 22 and sprocket 13. The braking force on roller 21 is adjusted to apply a tensile force to film 6 in opposition to and greater than the maximum tensile force applied to film 6 by the take-up spool torque so that sprocket 13 always assumes the operational characteristics of a drive sprocket as opposed to a hold-back sprocket, and thus reduces the need for carefully controlled bearing clearances in the remainder of transport system 9 to provide sufficient film drag to assure that sprocket 13 will function as a drive sprocket. The braking force of roller 21 in combination with the normal bearing friction of sound drum shaft 18 and the braking force of pressure roller 14 is sufficient to successfully dampen any oscillations in film 6, for example, those started by a splice or other inhomogeneity in the system.

The invention has been described in detail with particular reference to preferred embodiments thereof, but it will be understood that variations and modifications can be effected within the spirit and scope of the invention as described hereinabove and as defined in the appended claims.

I claim:
1. In a rotatable film transport system for a sound recording and reproducing mechanism, the combination with a sound drum, a sound scanning station associated with said drum, means for holding a film to be scanned in wrapped relation with said drum whereby movement of the film will rotate said drum, film drive means for moving the film at a substantially constant rate past said scanning station and spaced from said drum, and film take-up means for applying a predetermined tensile force to the film for winding the film on said take-up means; of a movable film supporting means interposed between said sound drum and said film drive means and cooperating therewith to form a support for the entire length of the film extending between said drum and drive means except for a reach of film between said film supporting means and drive means which is a small percentage of said entire length of film; and means for braking said supporting means to place said reach of film under sufficient tension to maintain said reach of film taut at all times.

2. The invention according to claim 1 wherein said braking means subjects said film to a tensile force in opposition to and greater than said predetermined tensile force whereby said film drive means constantly functions as a positive drive means.

3. The invention according to claim 1 wherein the film supporting means comprises a plurality of rollers, the periphery of the first of said rollers being spaced from the periphery of said sound drum a distance substantially equal to the thickness of said film, and the periphery of the second of said rollers being spaced from the periphery of said first roller a distance substantially equal to the thickness of said film whereby every portion of said film between said sound drum and said second roller is supported.

4. The invention according to claim 3 wherein one of said first and second rollers is rotatably mounted on a fixed shaft, and said breaking means comprises a spring disc interposed between a shoulder provided by said shaft and one side of said one roller, and said one roller is axially movable on said shaft to vary the tention of said spring against said one roller, said braking means further applying a tensile force to said film in opposition to and greater than said predetermined tensile force.

5. The invention according to claim 3 wherein the periphery of said second roller is spaced from said film drive means only a distance sufficient to provide clearance between the periphery of said second roller and said film drive means.

6. The invention according to claim 3 wherein one of said first and second rollers is provided with said breaking means.

7. The invention according to claim 6 wherein said braking means comprises a friction disc cooperating with said first roller.

8. The invention according to claim 7 wherein said friction disc is adjustable.

References Cited in the file of this patent
UNITED STATES PATENTS

| | | |
|---|---|---|
| 1,987,406 | May | Jan. 8, 1935 |
| 2,008,402 | Regan | July 16, 1935 |
| 2,016,656 | Spence | Oct. 8, 1935 |
| 2,163,263 | Simons | June 20, 1939 |

UNITED STATES PATENT OFFICE
CERTIFICATE OF CORRECTION

Patent No. 3,062,924

November 6, 1962

Robert B. Johnson

It is hereby certified that error appears in the above numbered patent requiring correction and that the said Letters Patent should read as corrected below.

Column 3, line 66, strike out "rotatable" and insert the same after "a", first occurrence, in line 2, column 4.

Signed and sealed this 14th day of May 1963.

(SEAL)
Attest:

ERNEST W. SWIDER
Attesting Officer

DAVID L. LADD
Commissioner of Patents